United States Patent [19]

Bergsma et al.

[11] Patent Number: 5,755,252
[45] Date of Patent: *May 26, 1998

[54] CONTROL VALVE WITH TWO-STAGE SHUTOFF AND PEEL AWAY OPENING ACTION

[75] Inventors: Rudolph Bergsma, Ann Arbor; Robert P. Benjey, Dexter, both of Mich.

[73] Assignee: G.T. Products, Inc., Ann Arbor, Mich.

[*] Notice: The term of this patent shall not extend beyond the expiration date of Pat. No. 5,590,697.

[21] Appl. No.: 713,583

[22] Filed: Sep. 13, 1996

Related U.S. Application Data

[63] Continuation-in-part of Ser. No. 295,196, Aug. 24, 1994, Pat. No. 5,590,697.
[51] Int. Cl.[6] ............................................. F16K 24/04
[52] U.S. Cl. ...................................... 137/202; 137/43
[58] Field of Search ........................................ 137/43, 202

[56] References Cited

U.S. PATENT DOCUMENTS

| | | | |
|---|---|---|---|
| 4,753,262 | 6/1988 | Bergsma | 137/43 X |
| 4,982,757 | 1/1991 | Ohasi et al. | 137/202 |
| 5,044,389 | 9/1991 | Gimby | 137/43 X |
| 5,439,023 | 8/1995 | Horikawa | 137/202 |
| 5,590,697 | 1/1997 | Benjey et al. | 137/202 X |

*Primary Examiner*—Gerald A. Michalsky
*Attorney, Agent, or Firm*—Young & Basile, P.C.

[57] ABSTRACT

An inventive liquid level operated control valve which shuts off refueling with a two-stage closing operation providing an initial soft shutoff and a final shutoff. A first valve element is spring-biased within a first valve cage on the upper end of the float mechanism to seal against a primary vent outlet to provide the initial shutoff. A second valve element contained in a second valve cage within the first valve cage is coaxially arranged with the first valve element and serves to close a secondary vent outlet through the first valve element for the final shutoff. The decorking operation of the valve is improved with a dual peelaway action, in which both the first and second valve cages are configured to circumferentially peel their respective valve elements from their respective sealing positions. Additionally, the resilient seal member for the primary valve element is located on the valve body around the vent outlet to provide a positive seal while reducing the area of the resilient seal across which a tank/canister pressure differential might act to keep the valve closed when liquid levels drop.

11 Claims, 6 Drawing Sheets

CONTROL VALVE WITH TWO-STAGE SHUTOFF AND PEEL AWAY OPENING ACTION

RELATION TO PRIOR APPLICATION

This application is a continuation in part of U.S. patent application Ser. No. 08/295,196 filed Aug. 24, 1994, now U.S. Pat. No. 5,590,697.

FIELD OF THE INVENTION

The present invention relates generally to "onboard" type fuel vapor recovery systems for vehicle fuel tanks, wherein fuel vapor generated during the refueling process is vented to onboard vapor recovery apparatus such as a carbon canister.

BACKGROUND OF THE INVENTION

Systems for controlling the flow of fuel vapor from a vehicle fuel tank to a recovery apparatus such as a carbon canister are generally known. A common approach is to place a control valve in series between the fuel tank and the vapor trap to selectively open and close the vapor venting pathway in response to changes in vehicle refueling activity.

Some known vapor control valves open or close in response to pressure conditions at the filler pipe inlet, for example when a filler pipe cap is removed or replaced to indicate the start or finish of refueling operations.

Other pressure-operated control valves respond to vapor pressure in the fuel tank itself to open, close, or adjust the rate at which fuel vapor is vented.

Another known type of valve responds to the level of liquid fuel in the tank, staying open to vent vapor as long as the fuel level is below a predetermined level. These are sometimes referred to as "fill control" or "shutoff" valves, since their closing creates a sudden pressure increase in the tank which prevents further refueling.

Prior vapor recovery systems often use pressure-operated control valves, sometimes supplemented with rollover and/or fill control valves to supplement the pressure operated vapor control. Disadvantages of such pressure-operated systems include their relative complexity and cost; their sensitivity to changing pressure conditions in the fuel system; and, the need for vapor seal and/or signal structure in the filler pipe, for example filler nozzle trap doors and signal pressure lines to prevent the loss of fuel vapor to the atmosphere during refueling and/or to provide signal or actuation pressure to the control valve.

One known technique for eliminating filler nozzle trap door or other seal structure in the filler pipe is to create a "dynamic" seal in the pipe using only the flow effects of a high velocity stream of fuel from the filler nozzle. By properly shaping the filler pipe in the region where the filler nozzle is located during refueling, and pumping the fuel at high velocity, a vacuum or draw-type seal can be created and maintained around the filler nozzle during refueling. This eliminates the need for seal door and similar structure. However, many pressure-operated control valves cannot function without such structure in the filler pipe. The dynamic sealing generates higher refueling pressure in the tank, tending to cause undesirable fuel expulsion or "spit back" from the filler pipe inlet at the end of the refueling operation. The prior art has not adequately addressed the need for an onboard vapor recovery system suitable for high pressure refueling with a dynamic filler pipe seal.

The present invention is a fuel level responsive control valve comprising a two-stage shutoff valve with a cushioned, "soft" initial shutoff for high pressure refueling operations. The control valve includes primary and secondary venting ports successively closed by first and second valve structure at first and second fuel levels. In the presently claimed embodiment, the shutoff valve comprises a coaxial shutoff valve with coaxially offset primary and secondary vent ports and associated valve structure with dual "peelaway" function. As will be apparent to those skilled in the art, this two-stage shutoff valve is especially well-suited for the inventive fuel system described above, although it has utility used alone or in different systems.

Another feature of the control valve of the present invention is an enhanced seal for the primary valve element which, along with the dual peelaway of the primary and secondary valve elements, positively ensures proper decorking even at relatively high pressure differentials across the valve element. In the preferred, illustrated form, the improved seal comprises a lip-type seal mounted to the valve body itself around the vent outlet closed by the primary valve element. This improved seal replaces the umbrella type seal mounted on the primary valve element itself in the original disclosure.

These and other features of the invention will become apparent upon further reading of the specification.

DETAILED DESCRIPTION OF THE DRAWINGS

Figure 1:
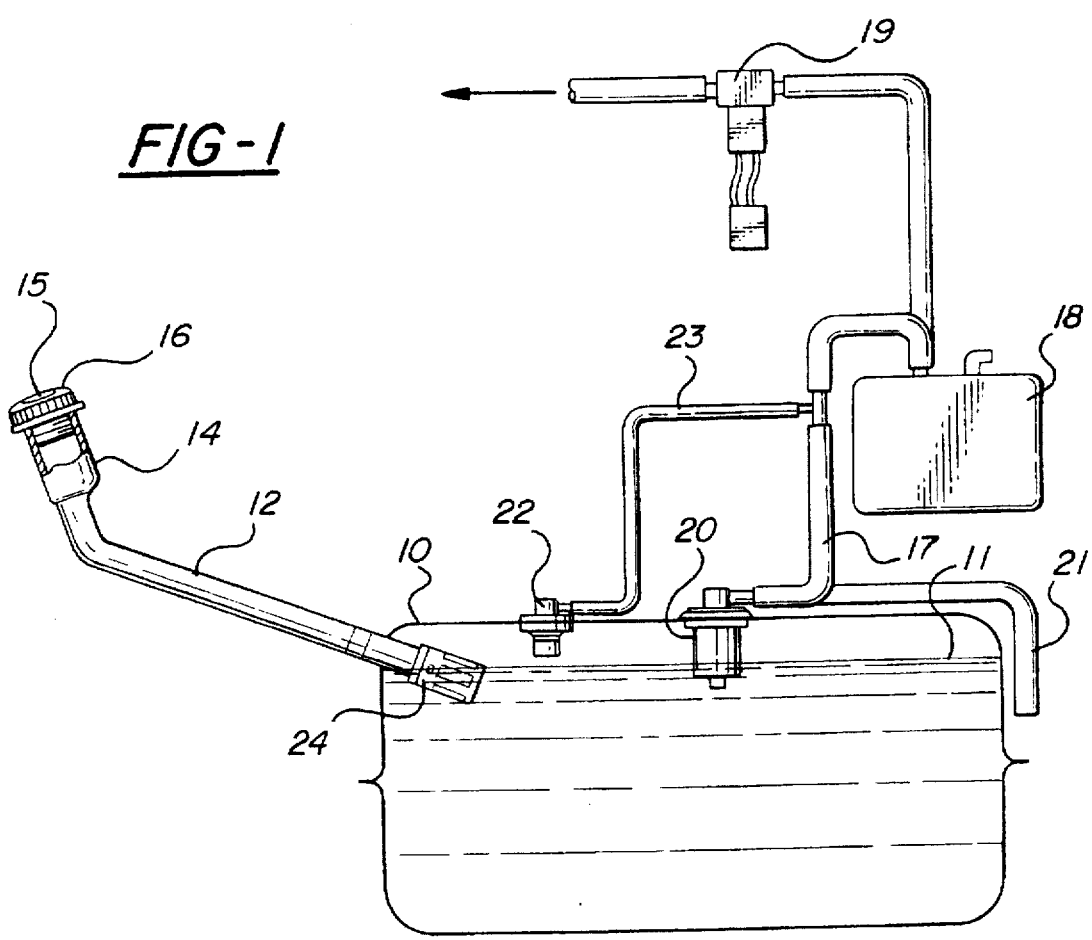
FIG. 1 is a schematic illustration of a vehicle fuel system with an onboard vapor recovery system.
Figure 6:
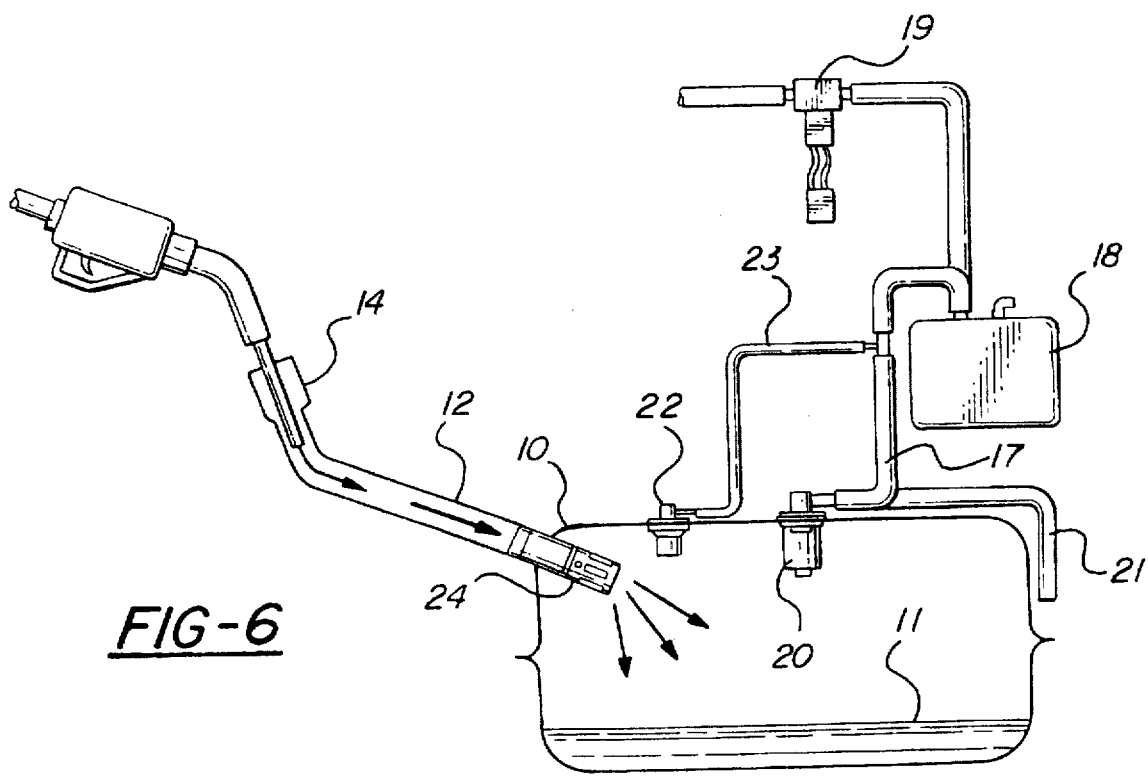
FIG. 6 illustrates the system of FIG. 1 during a refueling operation.

Referring now to FIG. 1, an onboard vapor recovery system according to the present invention is shown for a vehicle fuel system comprising a tank 10, a filler pipe 12 with an inlet 14 selectively closed by cap 16, and a vapor canister 18 connected to tank 10 by a vent line 17. The filler pipe in the inventive system is configured to create a dynamic seal with a filler nozzle during refueling; i.e., fuel pumped at high velocity from the filler nozzle into the filler pipe creates a vacuum-type seal adjacent the filler nozzle outlet to prevent the escape of fuel vapor out the filler pipe inlet. In the illustrated embodiment the dynamic seal results in fuel being introduced into the tank at a pressure head of approximately eighteen to twenty inches of water pressure.

Prior systems without dynamic sealing often operate at refueling pressures of around seven to ten inches.

Fuel vapor from tank 10 is vented through line 17 to canister 18, where it is adsorbed and periodically purged to the engine for combustion. Fuel vapor venting from tank 10 via line 17 to canister 18 is through a fuel level responsive control valve 20 (FIG. 2) or 120 (FIG. 3), mounted in a suitable aperture in the fuel tank to be closed by liquid fuel at or above a predetermined level shown at 11. When the liquid fuel level 11 in tank 10 is below that predetermined level, valve 20 remains open to vent fuel vapor to canister 18.

In the illustrated embodiment control valve 20 (or 120) substantially reduces, but does not abruptly halt, vapor venting from the tank to the vapor canister when an approximate full fuel level is reached. Instead, valve 20 provides a limited amount of additional, low volume vapor venting between a first full level and a slightly higher maximum "round off" level. This results in an initial "soft" shutoff at the first full level to prevent overly rapid backup of fuel in the filler pipe and possible spit back onto the person operating the filler nozzle. When the initial shutoff occurs, the resulting rise in tank pressure forces fuel back up the filler pipe to cover the mouth of the filler nozzle, activating an internal shutoff mechanism in the filler nozzle in known manner. After a short time the fuel standing in the filler pipe drains back into the tank. If the nozzle operator continues to fill the tank after being cued by the initial shutoff, the valve closes at the maximum level to trigger a final shutoff and end the refueling activity.

The system of the present invention also includes a rollover-type head valve 22, in the illustrated embodiment of FIG. 1 a separate valve 22 mounted in the fuel tank to vent fuel vapor to canister 18 through line 23. Rollover head valve 22 is designed to maintain a sufficient pressure head in the vapor space of the fuel tank after valve 20 has closed for fuel to accumulate in the filler pipe for nozzle shutoff. For example, head valve 22 maintains approximately twenty inches of water pressure. Below this pressure rollover head valve 22 remains closed; above this pressure rollover head valve 22 opens to rapidly vent fuel vapor to canister 18. In the illustrated embodiment of FIG. 1, rollover head valve 22 includes a small bleed orifice or vent, for example on the order of 0.020 inches diameter, to provide a low volume, continuous vent from the fuel tank to the canister. As described below, the bleed in valve 22 provides sufficient head valve bypass to result in a pressure reduction after fill occurs within a reasonable time.

Still referring to FIG. 1, the system of the present invention also includes a one way, low back pressure, liquid seal check valve 24 in the lower end of the filler pipe at or below the full fuel level. High velocity fuel introduced from the upper end of the filler pipe during refueling forces check valve 24 open to fill the fuel tank. When control valve 20 closes to seal the tank and refueling ceases, check valve 24 positively closes against the pressurized fuel in the tank to prevent it from being expelled out the filler pipe.

The one way nature of check valve 24 prevents its being forced open for reverse fluid flow from the tank to the filler pipe.

Vacuum relief for the fuel tank is provided by suitable vacuum relief structure 15 in cap 16 of a known type, acting in series with check valve 24. For example, if negative pressure conditions occur in the vapor space in tank 10, the pressure imbalance across check valve 24 will cause it to open, relieving the tank with pressure stored in filler pipe 12. If this residual pressure is not enough to relieve the tank vacuum, the vacuum relief valve structure 15 in cap 16 will additionally open to provide atmospheric relief pressure through pipe 12 and check valve 24 to the tank. This arrangement complements the inherent vacuum relief structure in either of valves 20 or 22. The bleed in valve 22 may provide some vacuum relief prior to relief through cap 16; and vacuum relief can sometimes occur across the float structure in valve 20, which can be forced downwardly against liquid fuel if the vacuum pressure differential across it is high enough.

FIG. 1 illustrates the vehicle fuel system immediately after the tank has been filled to the maximum level and refueling has ceased. In this condition control valve 20 is closed, rollover head valve 22 is closed (assuming a pressure head in tank 10 at or below the pressure relief level of the rollover head valve), and check valve 24 is closed. A column of liquid fuel (not shown) may remain standing in the filler pipe above the check valve. Except for the low volume bleed vent in rollover head valve 22, the entire system is closed.

The low volume bleed vent in rollover head valve 22 dissipates the closed system pressure to the canister, maintaining the pressure head for a short time (for example, less than a minute) after the check valve 24 and shutoff valve 20 have closed. Temporarily maintaining the closed system pressure head in this manner discourages attempts at overfilling for a reasonable period, and then allows tank pressure to decay so that standing fuel in the filler pipe can drain into the tank and overall system pressure is reduced.

Should tank pressure increase in this closed system condition beyond the capacity of the bleed vent, for example if the vehicle is left parked with the tank at maximum fuel level and at high temperature, the rollover head valve 22 opens for rapid venting until the excess pressure is relieved. In this extreme case, the tank pressure will not significantly exceed the twenty-inch head maintained by the head valve, although some hysteresis in pressure reduction may initially occur depending on the exact rollover structure used.

It should be noted that the check valve 24 will remain closed by the spring and the high fuel level if the cap is removed, preventing fuel expulsion. If the vehicle is driven in this closed-system condition, fuel sloshing will intermittently open shutoff valve 20, which will rapidly reduce tank pressure.

A vent line 21 from valve 20 to the atmosphere provides emergency pressure relief in a manner described below in reference to FIG. 2.

The control valve 20 is open both during refueling and normal vehicle operation, so long as the fuel level in the tank is below the maximum (i.e., reopening) level, which those skilled in the art will recognize as varying slightly as the result of different tank pressures and the effects of hysteresis. Vapor is accordingly vented to the canister 18 on a relatively continuous basis. To prevent saturation of the canister with fuel vapor, an electronic purge solenoid 19 is connected downstream from the canister to periodically allow vacuum from the vehicle intake manifold to "purge" vapor from the canister to the engine.

It can be seen from the foregoing that the fuel level responsive control valve 20, head valve 22 and check valve 24 provide complementary vapor recovery, shutoff and spit back-prevention in a manner uniquely coordinated for high pressure refueling with a dynamically-sealed filler pipe. Fuel level responsive valve 20 (120) vents freely until the tank is filled, at which point its cushioned shutoff provides a first level of spit back protection against the high pressure refueling. Head valve 22 maintains the high pressure head needed in the tank to provide a shutoff-inducing back pressure after valve 20 has closed, at least long enough to discourage overfilling attempts, and then reduces overall pressure with a controlled bleed. Check valve 24 provides an immediate, reliable check against spit back from the tank pressure accumulated for the shutoff function. Check valve 24 also maintains a back pressure low enough to avoid premature shutoff of the filler nozzle.

Figure 2:
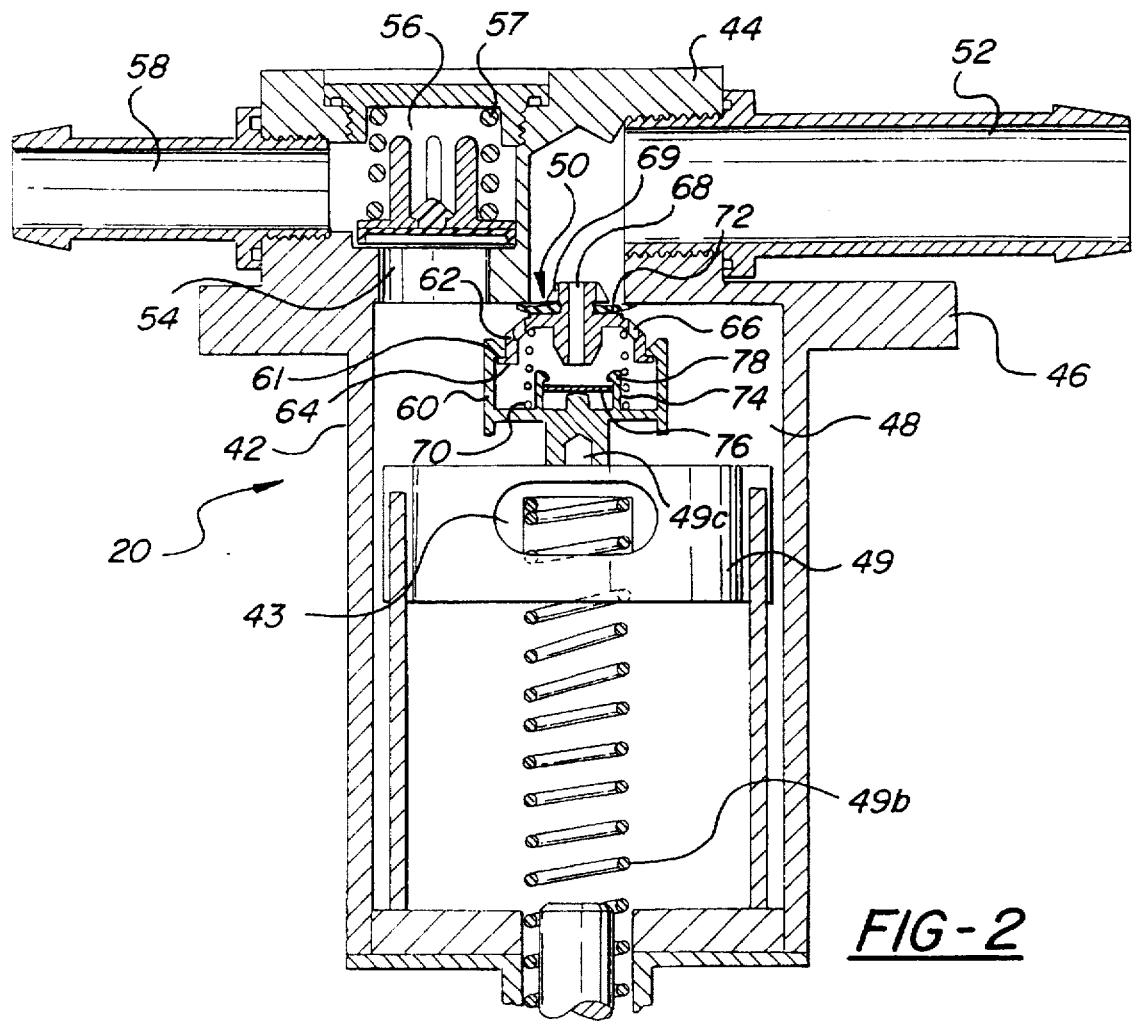
FIG. 2 is a section view of a coaxial fuel level responsive control valve employed in the system of FIG. 1.
Figure 2A:
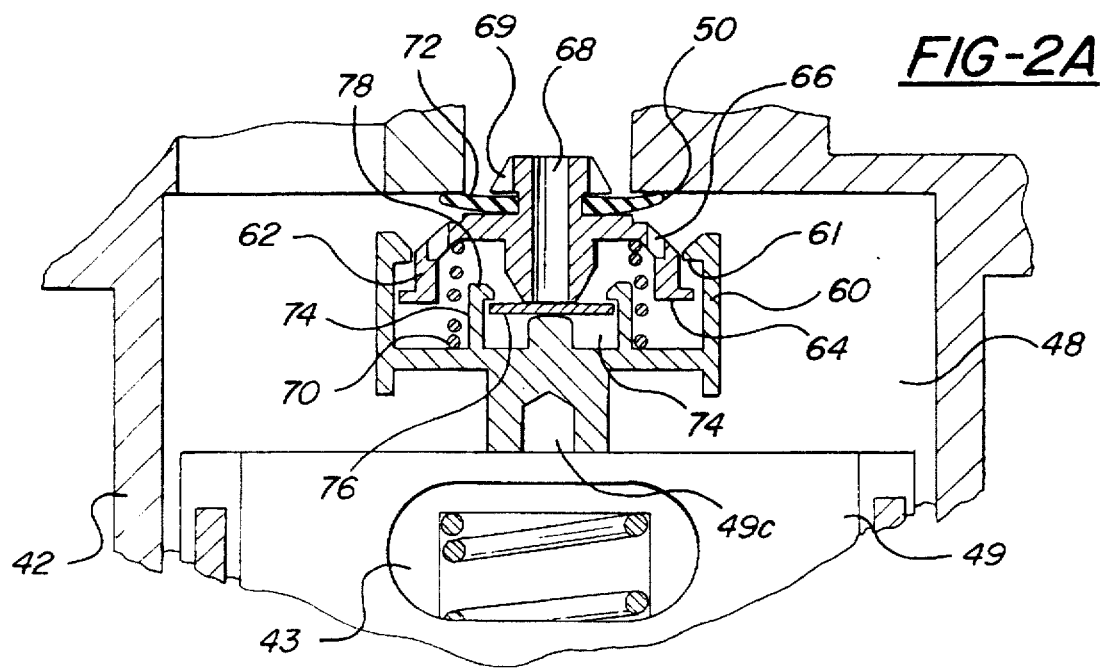
FIG. 2A illustrates the valve of FIG. 2 in a fully closed condition.

Referring now to FIGS. 2 and 2A, a first embodiment of a shutoff type control valve suitable for the system of FIG. 1 is illustrated. Valve 20 comprises an essentially hollow valve body mounted in a suitable aperture in the fuel tank. Lower half 42 of the valve is located in the interior of the fuel tank, and communicates with an upper half 44 outside the fuel tank. The valve is fastened to the fuel tank in liquid- and vapor tight manner by connector flange 46, for example by hot plate welding, ultrasonic welding, grommet-type seal or other known techniques.

Lower half 42 of valve 20 defines a float chamber 48 open at its lower end to receive liquid fuel as the fuel level in the tank rises to the full level. Radial vent ports 43 and holes 47 in the bottom end of lower half 42 provide vapor and liquid communication between tank 10 and float chamber 48. At its upper end float chamber 48 includes a primary vent port 50 opening into the upper half 44 of the valve and communicating with an outlet 52 connected by conduit or hose 17 (FIG. 1) to vapor canister 18.

Valve 20 can be provided with baffle structure (not shown) associated with vent ports 43 in chamber 48, to prevent liquid fuel from splashing through vent ports 43 to port 50.

Chamber 48 also includes a pressure relief port 54 at its upper end, opened and closed by spring-biased pressure relief valve 56 to selectively vent chamber 48 to a pressure relief outlet 58 connected to the atmosphere (by line 21 in FIG. 1).

A fuel level responsive float 49 is contained in chamber 48 for up and down movement on guide pins 49a as the float chamber fills with liquid fuel through holes 47 and vents 43. The density of float 49 is balanced relative to that of the fuel, for example with a spring 49b, such that it closes when immersed in liquid fuel in both upright and rollover situations. Float 49 may have a density less than, equal to, or greater than that of the fuel, balanced by spring 49b as desired for fill control and rollover function.

Referring to FIGS. 2 and 2A, the upper end of float 49 is connected by spindle 49c to a first valve cage 60 defining a cylindrical cup containing a primary shutoff valve element 62. Primary valve element 62 is axially trapped in cage 60 by interference between its shoulder 64 with lip 61 on cage 60. Valve element 62 includes a number of vent apertures 66 which allow vapor communication between float chamber 48 and the interior of valve cage 60. Valve element 62 also includes a central vent passageway 68 aligned with vent port 50. Primary valve element 62 is normally forced against lip 61 at the upper end of cage 60 by a spring 70. Valve element 62 supports a sealing member 72 at its upper end, for example a resilient rubber-like disc retained by an angled collar 69.

A second valve cage 74 is formed inside valve cage 60, containing a secondary valve disk 76. Valve cage 74 comprises a plurality of actuation fingers 78 of varying height around the periphery of valve disk 76. Valve disk 76 is free to move axially within cage 74 between the upper ends of fingers 78 and a centering bead. Second valve cage 74 and secondary valve 76 can comprise, for example, peeling action valve structure of the type shown and described in U.S. Pat. No. 4,753,262 to R. Bergsma, co-owned by the assignee of this application.

In operation, float 49 and the primary and secondary valve elements 62,76 remain in a lower position in float chamber 48 away from primary vent port 50 whenever the fuel level is below a predetermined level.

When the fuel reaches a predetermined near-full level, float 49 rises in chamber 48, forcing seal 72 on primary valve element 62 against the primary vent port 50. This closes primary vent port 50, but leaves open the lower volume venting from chamber 48 through valve cage 60 via apertures 66 and passageway 68 in valve 62. The result is a significant reduction in the rate of vapor venting, causing a rapid but controlled rise in the tank head pressure. This in turn forces fuel back up the filler pipe at a controlled rate, actuating the filler nozzle mechanism for an initial "soft" shutoff without spit back onto the operator.

The initial shutoff is a cue to the operator that the tank is close to full. At this point primary valve 62 is in the position shown in FIG. 2, above valve disk 76 resting in cage 74, held in place by the force of spring 70.

After the initial soft shutoff and the shutoff-inducing rise in tank pressure, vapor pressure in the tank is dissipated fairly quickly, for example in a few seconds, through the secondary vent path defined by apertures 66 and passageway 68. This allows the fuel backed up in the filler pipe to drain into the tank. As a result, a small amount of additional fuel can be added to round off the tank by "clicking" the filler nozzle operating handle.

If the nozzle operator should choose to add fuel after the initial shutoff, float 49, cage 60 and cage 74 are forced upwardly by the rising fuel against spring 70 until valve disk 76 contacts and closes off central passageway 68 in valve 62 as shown in FIG. 2a. This completely closes venting from the fuel tank through valve 20 to canister 18, and results in a final shutoff cue to the filler nozzle. Should the operator ignore these shutoff indications and unwisely persist in trying to add fuel beyond the initial shutoff cue, and somehow override or circumvent the filler nozzle shutoff mechanism and the few round-off "clicks" allowed before final shutoff, the fuel will simply back out the filler pipe inlet.

The two-stage soft shutoff with its cushioned initial shutoff and controlled round-off allowance can be adjusted as desired through the relative sizing of the primary and secondary vent ports or passages, spring forces, the relative height of the first and second valves controlling the amount of round-off, and in other ways which will be apparent to those skilled in the art. In the illustrated embodiment the primary and secondary valve 62,76 are calibrated to permit three or four clicks of round-off before completely closing the valve.

Valve 20 remains fully closed until the level of liquid fuel in the tank drops, with valve disk 76 first being peeled off passageway 68 by fingers 78 as float 49 drops, followed by valve 62 being pulled from vent port 50 by valve cage 60 as the float drops further.

Pressure relief valve 56, located above the maximum fuel level, is forced open against spring 57 when vapor pressure in the tank exceeds a predetermined safe level, for example sixty inches water pressure. Valve 56 would then open to reduce tank pressure to a safe level. The infrequency and nature of emergency pressure venting warrants venting valve 56 to the atmosphere for immediate pressure reduction.

Figure 3:
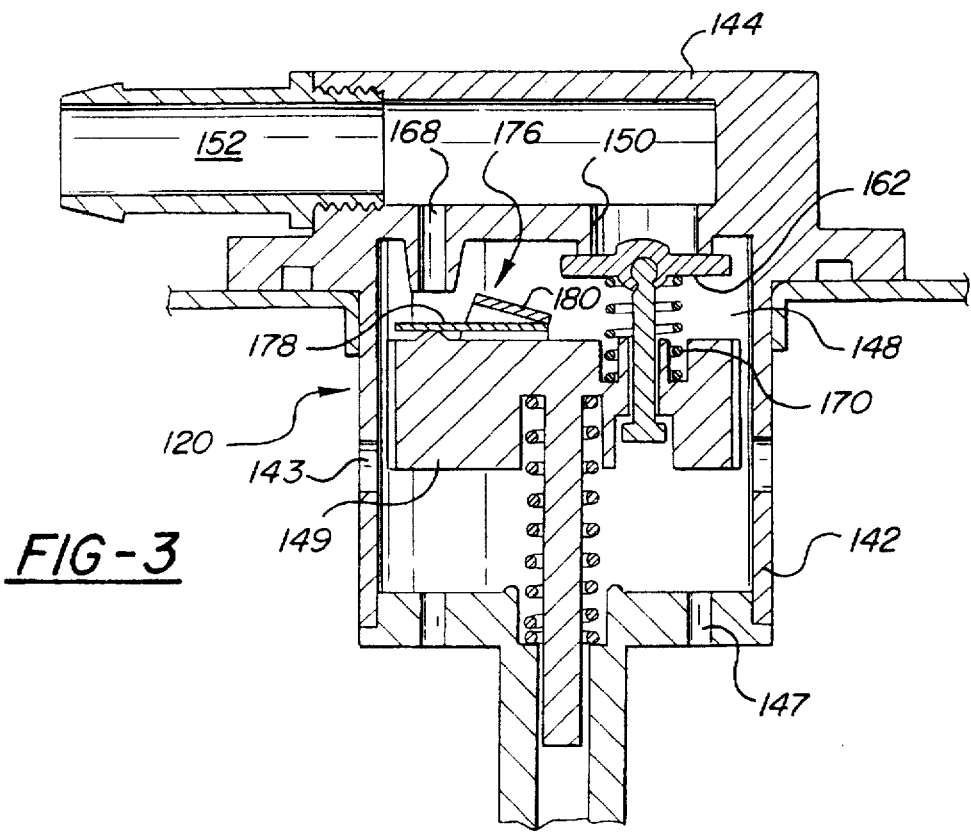
FIG. 3 is a section view of an alternate, offset control valve useful for the system of FIG. 1.
Figure 3A:
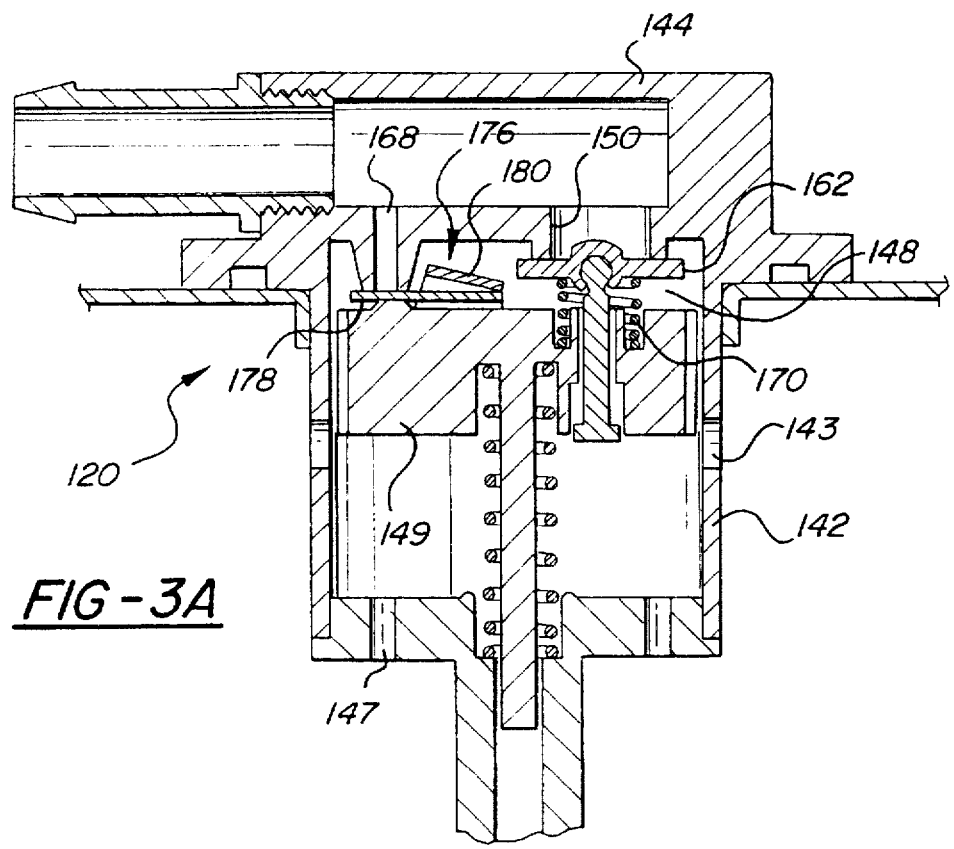
FIG. 3A is a section view of the valve of FIG. 3 in a fully closed condition.

FIGS. 3 and 3A illustrate an alternate two-stage soft shutoff valve 120 suitable for the system of FIG. 1. Its operation is similar to that of the valve in FIG. 2, but the primary and secondary valves are radially offset, rather than coaxially arranged.

In FIG. 3 a primary vent port 150 and a secondary vent passage 168 are radially spaced from one another at the upper end of float chamber 148. Vents 150,168 vent vapor from the tank to the upper half 144 of valve 120, where it passes to a vapor trap through outlet 152. Spring balanced float 149 supports a primary valve 162 for closing primary vent 150, and a secondary valve 176 for closing passageway 168. Primary valve 162 is normally positioned higher than valve 176 by bias spring 170.

Secondary valve 176 may, for example, be the peel-away type illustrated in U.S. Pat. No. 5,313,977 to Bergsma et al, co-owned by the assignee of the present application, including a valve element 178 and peel-away structure 180.

Float 149 and valves 162,176 remain below the vent ports 150,168 as long as liquid fuel is below the full or near-full level. When fuel in float chamber 148 reaches the predetermined "soft" shutoff level through radial and/or axial ports 143, 147 in lower half 142, float 149 is forced upwardly to initially close primary vent port 150 with valve 162. This initiates the initial soft shutoff described above. If the operator adds additional fuel by clicking the filler nozzle, float 149 is lifted further against spring 170 until second valve 176 contacts and closes off the secondary passageway 168 as shown in FIG. 3A. This finalizes the shutoff of control valve 120 in the manner described above in FIG. 2.

Valve 120 opens in a manner similar to valve 20 described in FIG. 2; i.e., valve 176 is first peeled off passageway 168 by the descending float, followed by valve 162 being pulled away from primary vent outlet 150 as the fuel level drops further. It will be apparent to those skilled in the art that, despite the different structure, valve 120 in FIG. 3 achieves a two-stage soft shutoff similar to that of valve 20 in FIG. 2. It is therefore suitable for use with the system of FIG. 1 in place of valve 20. It will also be apparent to those skilled in the art that such a valve has utility apart from the system of FIG. 1, either alone or in a different system. For example, valve 120 is useful for any onboard vapor recovery application where a two-stage, liquid-responsive closure with initial "soft" shutoff is desired.

Figure 4:
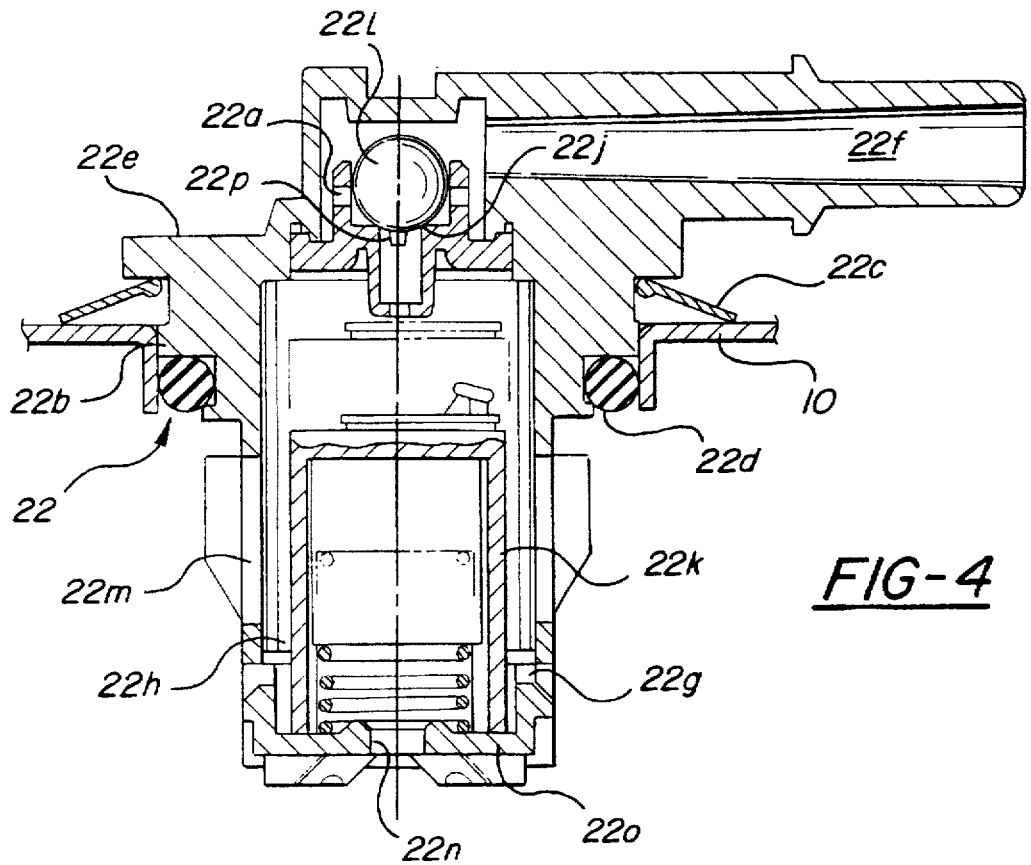
FIG. 4 is a section view of a rollover valve for use with the system of FIG. 1.

FIG. 4 illustrates one embodiment of a rollover-type head valve 22 suitable for use in the system of FIG. 1. Rollover head valve 22 comprises an essentially hollow body mounted to the fuel tank 10 through a suitable aperture via a shoulder portion 22b and resilient seal members 22c and 22d. Rollover head valve 22 has an upper half 22e located outside the tank and including an outlet 22f connected to the vapor canister as shown in FIG. 1 by suitable hose or conduit connection. A lower half 22g of the rollover head valve extends into the fuel tank, and includes a rollover float chamber 22h. At its upper end float chamber 22h communicates with outlet 22f by way of a rollover vent outlet 22i and a head valve vent outlet 22j. Rollover vent outlet 22i is selectively closed by a spring balanced rollover float valve 22k held in float chamber 22h, and head valve vent outlet 22j is normally closed by a ball-type head valve 22L. Float chamber 22h includes a number of radial vent ports 22m through which fuel vapor from the tank can enter float chamber 22h and pass through vent outlets 22i,22j to rollover head valve outlet 22f and the vapor canister. Float chamber 22h also includes a hole 22n in its end plate 22o through which liquid fuel enters the float chamber to raise float 22k when the liquid level in the tank rises to the level of rollover head valve 22.

Further explanation of the structure and operation of a rollover valve similar to 22k and a head valve similar to 22l is found in U.S. Pat. Nos. 5,313,977 to Bergsma et al and 5,253,668 to Mills, respectively, both co-owned by the assignee of this application.

FIG. 4 illustrates rollover head valve 22 in its normally closed condition for an upright vehicle orientation. The level of liquid fuel in the tank, even at maximum, remains below the level of rollover head valve 22, leaving rollover float valve 22k in the lowered position away from rollover vent outlet 22i. However, ball head valve 22L is calibrated to maintain a pressure head in the fuel tank higher than the pressure at which fuel is introduced into the tank during refueling once the shutoff control valve 20 has closed. Ball valve 22L accordingly remains in the closed position shown in solid lines in FIG. 4 in which the head valve vent outlet 22j is blocked by the ball valve element.

Rollover head valve 22 also includes a small bleed vent 22p, illustratively associated with the ball head valve outlet 22j, to provide a continuous, low volume vent from the fuel tank to the canister through rollover head valve 22 even in the valve closed condition of FIG. 4. Bleed vent 22p is calibrated to gradually reduce the pressure head maintained in the fuel tank after the control valve has closed, preferably for a sufficient time to deter further refueling attempts once the final shutoff has occurred as described above. In the illustrative embodiment bleed vent is in the order of 0.020 inches in diameter, and temporarily maintains a refuel-preventing pressure head in the tank after refueling has ceased.

Still referring to FIG. 4, head valve 22L opens as shown in phantom to permit high volume venting of fuel vapor from the tank to the canister through radial vents 22a in the ball-containing nest or cup when the desired pressure head in the tank is exceeded.

Should the vehicle enter a rollover orientation, or if fuel slosh or overfill levels rise to rollover head valve 22, rollover float valve 22k is forced against rollover vent outlet 22i as shown in phantom to completely close the valve and prevent liquid fuel from leaking to the canister.

Figures 5, 5A:
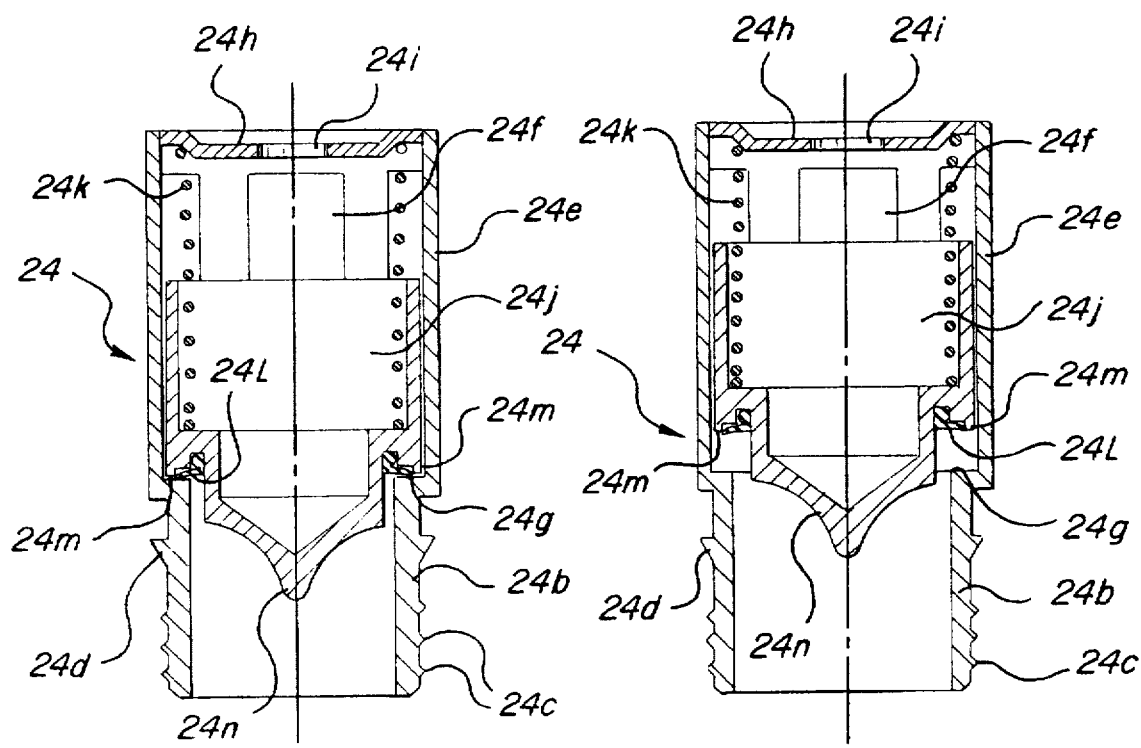
FIG. 5 is a section view of a liquid seal check valve for use in the filler pipe of FIG. 1.
FIG. 5A illustrates the valve of FIG. 5 in an open condition.

Referring now to FIG. 5, a first illustrative embodiment of a check valve 24 is illustrated for use with the system of FIG. 1. It comprises a hollow body having an upper cylindrical plug portion 24b inserted in the lower end of the filler pipe in a sealing, snap-retention fit. Upper plug portion 24b is provided about its circumference with seal beads 24c and a retention flange 24d for that purpose. Check valve 24 further includes a hollow, cylindrical lower valve chamber 24e with a number of radial vent ports 24f formed about its periphery. The junction of plug portion 24b and valve chamber 24e forms a valve seat 24g. The lower end of valve chamber 24e is closed by an end plate 24h with a central hole 24i. A piston-like hollow valve element 24j is located in valve chamber 24e for axial movement between valve seat 24g and end plate 24h. The diameter of valve element 24j is less than the interior dimensions of the valve chamber, such that liquid fuel from the filler pipe flows through plug portion 24b, across valve seat 24g, around valve element 24j, through radial vents 24f, and into the fuel tank. Valve element 24j is normally biased against valve seat 24g by spring 24k to close the check valve. A resilient seal member 24L seals against valve seat 24g in the closed position, protected from cutting or shearing by a raised shoulder 24m on the valve element radially exterior of seal 24L. The upper end of valve element 24j is formed as a rounded, conical flow pilot 24n which projects into plug portion 24b past seat 24g to direct fuel flow around the sides of valve element 24j.

Check valve 24 is a one way, positive closing valve which opens to admit fuel from the filler pipe into the fuel tank, but which positively closes as soon as the refueling operation terminates and/or the pressure in the fuel tank is equal to or greater than the pressure or weight of fuel in the filler pipe. In FIG. 5 check valve 24 is shown in the closed condition, with seal 24L pressed against valve seat 24g.

Referring to FIG. 5A, when liquid fuel is introduced under pressure through the filler pipe into upper plug portion 24b, it forces valve element 24j against spring 24k toward end plate 24h, opening a flow path across valve seat 24g and around valve element 24j through radial vents 24f. The rounded, cone-shaped flow pilot 24n directs flow around the outside of valve element 24j toward the radial vents to reduce turbulence and to generally assist flow through the check valve. As long as the force of fuel against valve element 24j is greater than the force exerted by spring 24k and the pressure in the fuel tank, check valve 24 remains in the open position of FIG. 5A.

To prevent valve element 24j from being held open by the suction effect of liquid fuel flowing through radial vents 24f at the lower end of check valve 24, hole 24i formed in end plate 24h eliminates such suction effects by providing a make-up pressure to the lower side of valve element 24j.

Referring now to FIGS. 7-10, a further embodiment of a coaxial control valve with two-stage closure having a soft initial shutoff is disclosed with an improved "decorking" operation. Specifically, the valve of FIGS. 7-10 is intended to operate at relatively high tank pressures, for example up to 30 inches of water pressure. This is generally achieved with a dual "peelaway" structure in which both the primary and second valve elements are successively peeled open. The peelaway of the primary valve element from the main vent outlet is further enhanced by removing the primary valve seal from the primary valve element and placing it on the valve body around the valve vent outlet.

Figure 7:
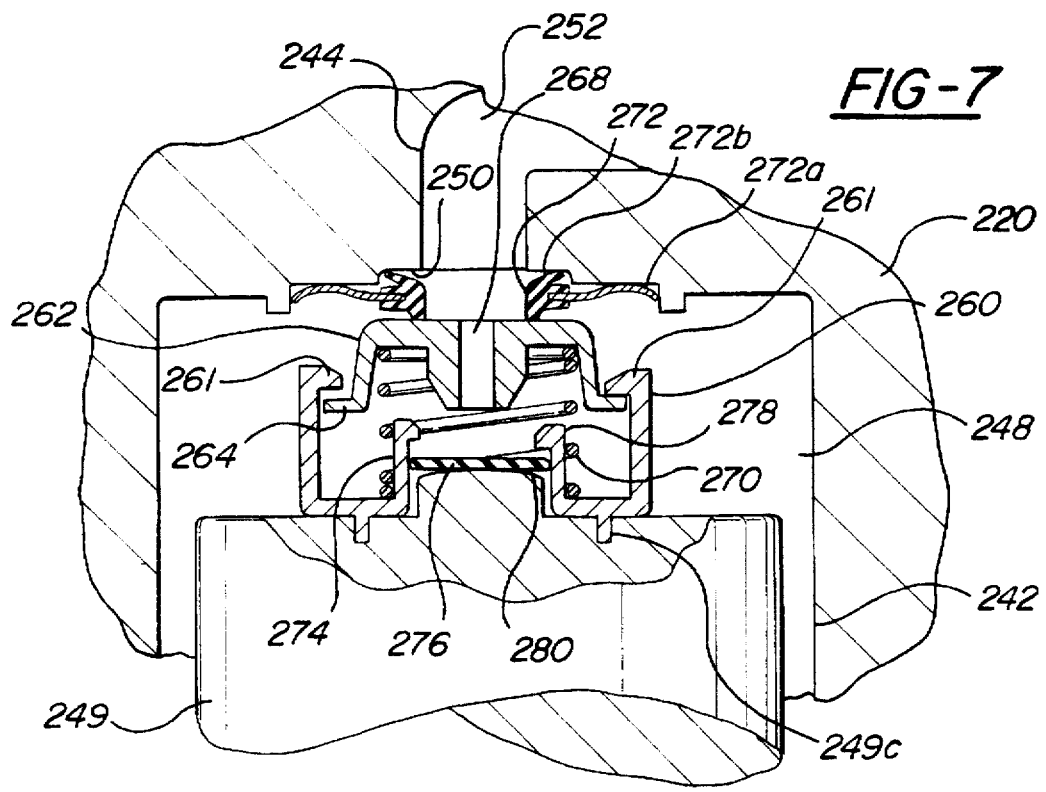
FIG. 7 illustrates an alternate coaxial valve arrangement according to the present invention.

Referring first to FIG. 7, a control valve 220 according to the presently claimed invention is disclosed in section view, with a focus on the valve structure at the top of the float mechanism. Control valve 220 functions in generally the same manner as the control valve 20 in FIGS. 2 and 2a, but with a primary valve element and seal arrangement which improves the initial decorking of the valve against tank/canister pressure differential. Valve 220 can be mounted in a fuel tank in the same manner as control valve 20 in FIG. 2, such that it is responsive to fuel level to selectively vent fuel vapor from the tank to the canister. It will be understood by those skilled in the art that, while valve 220 can be employed in a vapor venting system as illustrated in FIG. 1, it also has utility used alone or with different vapor venting systems. Those skilled in the art will recognize many uses for control valve 220.

Control valve 220 substantially reduces, but does not close, vapor venting from the tank to the vapor canister when an approximate full fuel level is reached. Instead, valve 220 provides a limited amount of additional, lower volume vapor venting between a first full level and a slightly higher maximum "round off" level. This results in an initial "soft" shutoff at the first full level to prevent overly rapid backup of fuel in the filler pipe and possible spitback onto the person operating the filler nozzle. When the initial shutoff occurs, the resulting rise in tank pressure forces fuel back up the filler pipe (assuming no other venting from the tank) to cover the mouth of the filler nozzle, activating the standard internal shutoff mechanism in the filler nozzle in known manner. After a short time the fuel standing in the filler pipe will drain back into the tank. If the nozzle operator continues to fill the tank after being cued by the initial shutoff, the valve closes at the maximum level to trigger a final shutoff and end the refueling activity.

The control valve 220 is open both during refueling and normal vehicle operation, so long as the fuel level in the tank is below the maximum (i.e., reopening) level, which those skilled in the art will recognize as varying slightly as the result of different tank pressures and the effects of hysteresis. Vapor is according vented to the canister 18 on a relatively continuous basis.

Still referring to FIG. 7, control valve 220 comprises an essentially hollow valve body mounted in a suitable aperture in the fuel tank wall. Lower portion 242 of the valve is located in the interior of the fuel tank to vent vapor and to be activated by fuel levels in the tank, and communicates with an upper portion 244 outside the fuel tank. The valve is fastened to the fuel tank in liquid- and vaportight manner, for example with a connector flange 46 as shown in FIGS. 2 and 2a, by known techniques such as hot plate welding, ultrasonic welding, or grommet-type seals. The lower or in-tank portion 242 of valve 220 defines a float chamber 248 open at its lower end to receive liquid fuel as the fuel level in the tank rises to the full level. For example, the lower portion 242 of control valve 220 in FIG. 7 can take the form of lower portion 42 of valve 20 in FIG. 2, with the same type of radial vent ports 43 and holes 47 to provide vapor and liquid communication between tank 10 and float chamber 248. It will be apparent to those skilled in the art that the exact structure of the in-tank portion of control valve 220 which defines the float chamber can vary, provided it permits liquid fuel into the float chamber to activate the shutoff, and provides a route for fuel vapor from the tank to the canister as long as the valve structure in control valve 220 remains at least partially open.

At its upper end float chamber 248 includes a primary vent port 250 opening into the upper portion 244 of the valve in communication with an outlet 252 connected by conduit or hose 17 (FIG. 1) to vapor canister 18.

Control valve 220 can be provided with baffle structure (not shown) associated with vent ports 43 in chamber 48, to prevent liquid fuel from splashing through vent ports 43 to port 50.

A fuel level responsive float 249 is contained in float chamber 248 for up and down movement as the float chamber fills with liquid fuel through inlets such as holes 47 and vents 43 as shown in FIG. 2. The density of float 249 is preferably balanced to that of the fuel, for example with a spring, such that it closes when submerged in liquid fuel in both upright and rollover situations. Float 249 may have a density less than, equal to, or greater than that of the fuel, balanced by a spring such as 49b in FIGS. 2 and 2a, as desired for fill control and rollover function.

A first valve cage 260 is connected to the upper end of float 249 by post or pins 249c in known manner. Valve cage 260 is a generally cylindrical, cup-shaped cage defined by multiple, circumferentially-spaced actuation fingers 261 surrounding a generally disk-shaped primary shutoff valve element 262. Primary valve element 262 is axially trapped in cage 260 by interference between its shoulder 264 with the upper ends of fingers 261 of cage 260. Actuation fingers 261 are of different height for a peelaway function described below.

Valve element 262 includes a central vent passageway 268 aligned with vent port 250. Primary valve element 262 is normally forced against the upper ends of fingers 261 in cage 260 by a spring 270 located in the cage.

As shown in FIG. 7, during shutoff the primary valve element 262 engages a sealing member 272 located on the valve body around vent port 250. In the illustrated embodiment seal member 272 comprises a resilient, rubber-like disk with a central aperture, fastened to the valve body with a Tinnerman type push-on retainer 272a. Seal member 272 seals in fluid- and vaportight fashion against the valve body around vent port 250 with upper lip seal 272b. It will be apparent to those skilled in the art that the seal member 272 around vent port 250 on the valve body may take different forms, provided that it creates an effective seal with the upper surface of primary valve element 262.

A second valve cage 274 is formed inside first valve cage 260, containing a secondary valve element 276. Valve cage 274 comprises a plurality of actuation fingers 278 of varying height around the periphery of valve element 276, which is illustrated in the form of a preferably rigid circular disk. Valve disk 276 is free to move axially within secondary cage 274 between the upper ends of fingers 278 and a centering bead 280. Secondary valve cage 274 and secondary valve 276 can comprise, for example, peeling action valve structure of the type shown and described in U.S. Pat. No. 4,753,262 to R. Bergsma, co-owned by the assignee of this application. It will be understood by those skilled in the art that action between the primary valve cage 260 and primary valve element 262 is similar to the peeling action of secondary valve cage 274 on secondary valve element 276.

Reference is now made to all of FIGS. 7–10 to describe the operation of control valve 220 in response to liquid fuel levels in the tank. Float 249 and the primary and secondary valve elements 262, 276 remain in a lower position in float chamber 248 away from primary vent port 250 whenever the fuel level is below a predetermined initial shutoff level, for example as shown in FIG. 1.

When the fuel reaches a predetermined near-full "initial shutoff" level, float 249 rises in chamber 248 as shown in FIG. 7, forcing the upper surface of primary valve element 262 against seal member 272 surrounding the primary vent port 250. This closes primary vent port 250, but leaves open a lower volume venting pathway from float chamber 248 through valve cage 260 via the spacing between actuation fingers 261 and through passageway 268 in valve element 262. The result is a significant reduction in the rate of vapor venting from the tank, causing a rapid but controlled rise in the tank pressure. This increase in pressure forces fuel back up the filler pipe at a controlled rate, actuating the filler nozzle mechanism for an initial "soft" shutoff without spitback onto the operator.

The initial shutoff is a cue to the operator that the tank is close to full. At this point primary valve 262 is in the position shown in FIG. 7, above valve disk 276 resting in cage 274, held in place by the force of spring 270.

After the initial soft shutoff and the shutoff-inducing rise in tank pressure, vapor pressure in the tank is typically dissipated fairly quickly, for example in a few seconds, through the secondary vent path defined by passageway 268 in the primary valve element. This allows the fuel backed up in the filler pipe to drain into the tank. As a result, a small amount of additional fuel can be added to round off the tank by "clicking" the filler nozzle operating handle.

Although the primary valve cage 260 in FIG. 7 is defined in the illustrated embodiment by a plurality of spaced actuation fingers, it will be apparent to those skilled in the art that a solid-walled cage might be used, provided it creates a similar peeling function. In such case, it would be necessary to provide a vent aperture in either the valve cage 260 or the primary valve element 262, for example such as aperture 66 illustrated in FIG. 2. Such apertures are, however, unnecessary in the preferred embodiment in FIG. 7, because the spacing between actuation fingers 261 provides the same function.

Figure 8:
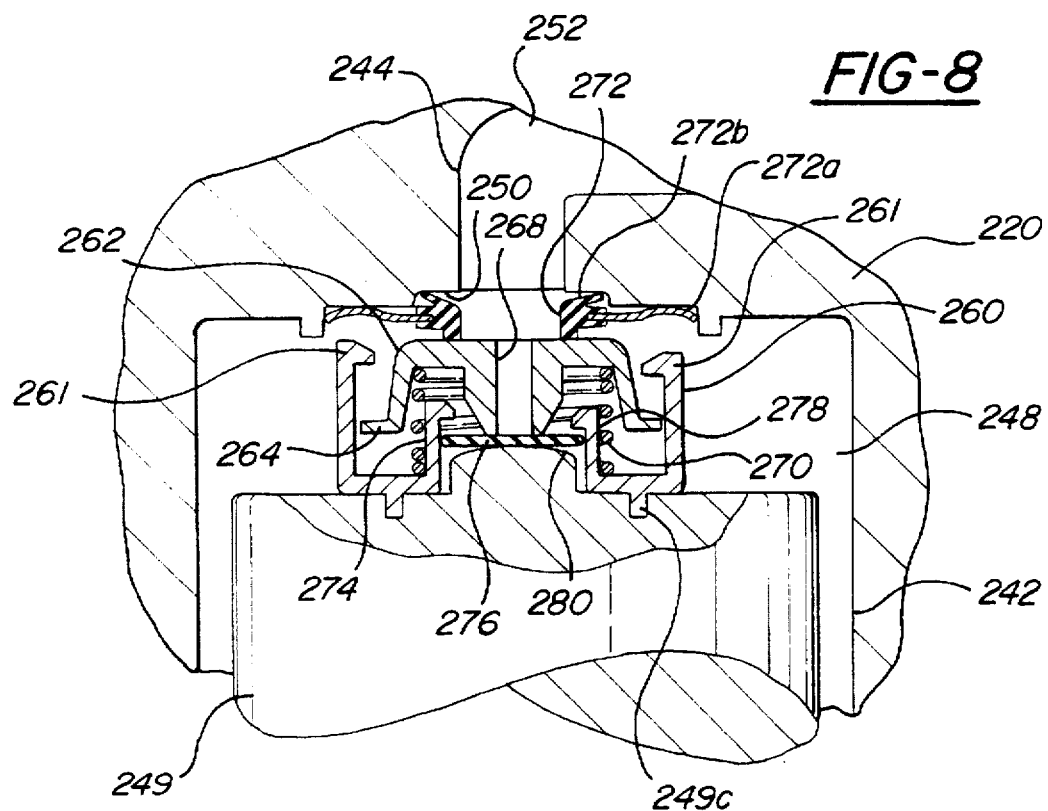
FIG. 8 illustrates the valve of FIG. 7 in a fully closed condition.

If fuel is added to the tank after the initial shutoff, float 249, cage 260 and cage 274 are forced upwardly by the rising fuel level against spring 270 until valve disk 276 contacts and closes off central passageway 268 in valve 262 as shown in FIG. 8. This completely closes venting from the fuel tank through valve 220 to canister 18, and results in a final shutoff cue to the filler nozzle shutoff mechanism.

The two-stage soft shutoff with its cushioned initial shutoff and controlled round-off allowance can be adjusted as desired through the relative sizing of the primary and secondary vent ports or passages, spring forces, the relative height of the first and second valves controlling the amount of round-off, and in other ways which will be apparent to those skilled in the art. In the illustrated embodiment the primary and secondary valves 262, 276 are calibrated to permit three or four clicks of round-off before completely closing the valve.

Figure 9:
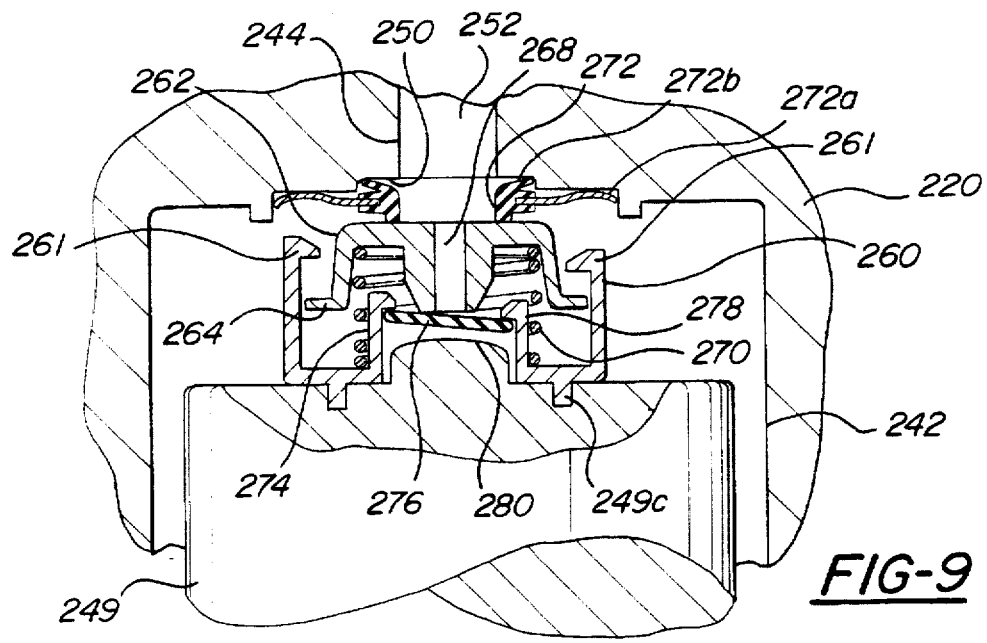
FIG. 9 illustrates the valve of FIG. 7 partially opened or "decorked"

Valve 220 remains fully closed as shown in FIG. 8 until the level of liquid fuel in the tank drops. Referring to FIG. 9, when the liquid fuel level drops, valve disk 276 is first peeled off passageway 268 by fingers 278 as float 249 descends with the fuel. FIG. 9 illustrates the initial "peel" of valve disk 276 as the lowermost of the actuating fingers in cage 274 engages the disk and cracks open its seal with passageway 268.

This initial cracking open or peeling action helps overcome the tank/canister pressure differential across valve disk 276, which the weight of float 249 might otherwise not be sufficient to overcome if it attempted to pull disk 276 off passageway 268 all at once.

Figure 10:
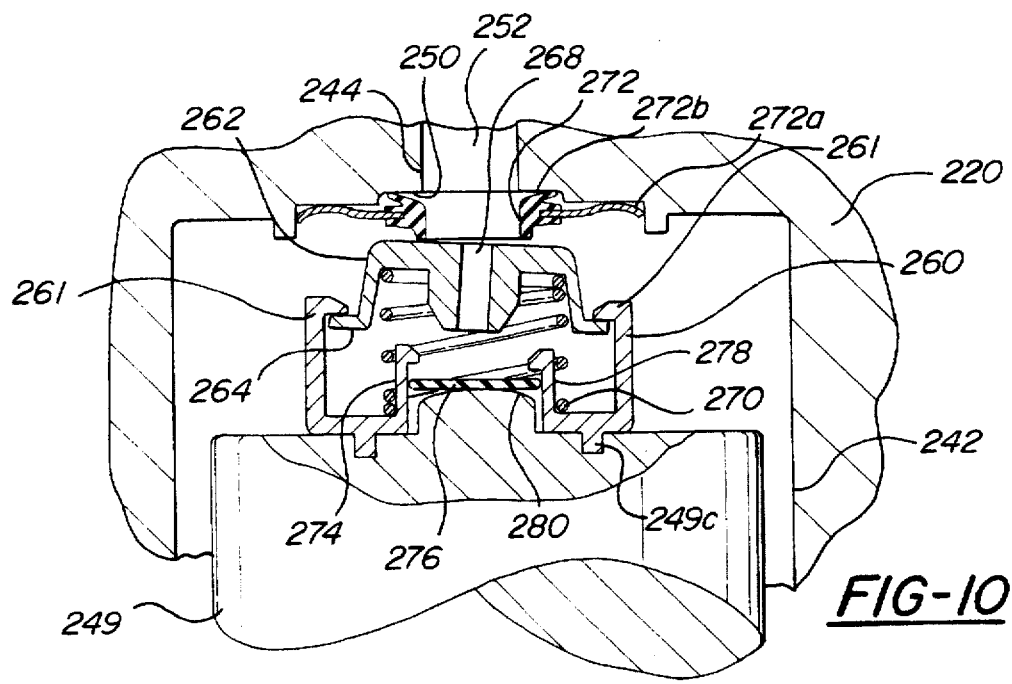
FIG. 10 illustrates the valve of FIG. 7 in a fully opened secondary port and a primary port starting to open.
Figure 11:
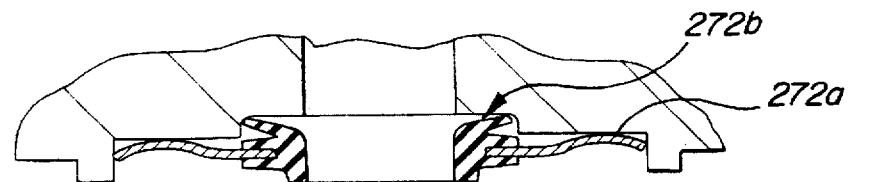
FIG. 11 is a detailed view of the mounting arrangement for the sealing member shown in FIGS. 7–10, in particular a Tinnerman spring clip arrangement in which the edge of the spring clip bites into the plastic of the valve body to hold it in place.

Referring to FIG. 10, as the fuel level drops further and disk 276 is peeled completely off passageway 268 and drops onto the centering bead, the lowermost actuation finger 261 of primary valve cage 260 engages an edge of primary valve element 262 and likewise begins to peel it open from seal member 272 by initially cracking it open at one point to reduce any tank/canister pressure differential which central passageway 268 is unable to sufficiently reduce on its own. As the float 249 continues to drop, primary valve element 262 is peeled completely from seal 272 by the uppermost actuation finger(s) 261, until it is pulled completely free and vent port 50 remains unobstructed.

It will be apparent to those skilled in the art that the placement of the resilient seal member on the valve body around the vent port, rather than on the primary valve element 262, coupled with the peeling action for both the primary and secondary valve elements, greatly reduces the possibility of the float becoming stuck or hungup, unable to pull the valve completely open due to a tank/canister pressure differential or capillary suction from liquids on sealing surfaces. The foregoing illustrative embodiment of a valve according to the present invention is exemplary in nature, and the invention should not be limited except as provided in the following claims.

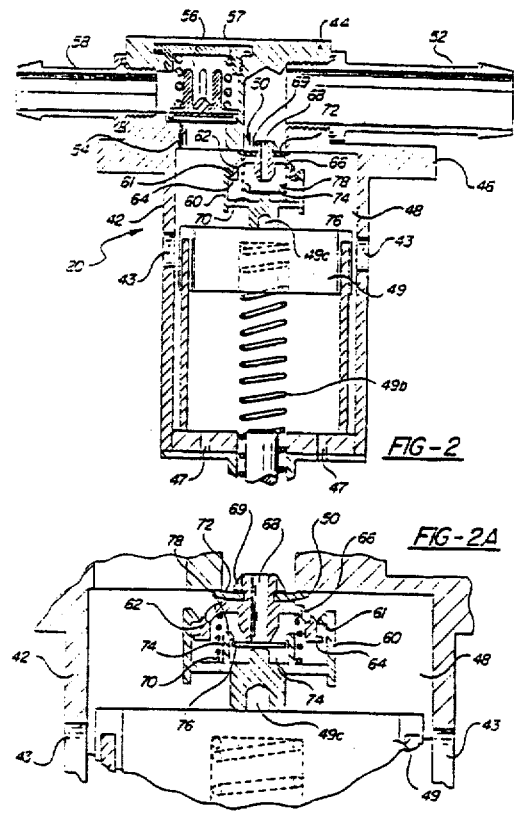

The invention claimed is:

1. A liquid-responsive control valve for controlling the venting of fuel vapor from a fuel tank to a vapor canister in a manner providing a shutoff cue to a person filling the tank, comprising:

a control valve adapted for venting fuel vapor from the tank to the canister at a first higher rate when the fuel level in the tank is below a first level, at a second lower rate when the fuel level in the tank reaches the first level, and for closing when a second higher fuel level in the tank is reached, the control valve comprising two stage offset valve means responsive to the level of liquid fuel in the tank, the offset valve means comprising liquid level responsive float means, first and second valve means associated with the float means, and first and second vent outlet means, the float means being responsive to liquid fuel reaching the first level to force the first valve means to a position closing the first vent outlet means, the first valve means further including means for biasing the first valve means from the second valve means, and the float means being responsive to liquid fuel level above the first level to force the second valve means against the bias of the first valve means into sealing engagement with the second vent outlet means to close the control valve means;

wherein the first valve means comprises a first valve element axially moveable within a first valve cage, the first valve cage comprising a plurality of actuation fingers of varying height, at least one actuation finger being adapted to peel the first valve element from the first vent outlet means when the float means moves away from the first vent outlet means in response to descending liquid fuel level.

2. The control valve of claim 1, wherein the first valve means comprises a valve element mounted on the float means and a seal member associated with the first vent outlet means, such that the first valve means engages the seal member when the first valve means is forced to a position closing the first vent outlet means.

3. The control valve of claim 1, wherein the second valve means comprises a second valve element in a second valve cage contained within the first valve cage below the first valve element.

4. The control valve of claim 3, wherein the second valve cage comprises a plurality of actuation fingers of varying height.

5. The control valve of claim 2, wherein the seal member includes at least a portion made from a resilient material.

6. The control valve of claim 5, wherein the resilient portion comprises a lip-type seal mounted to the valve body around the first vent outlet.

7. The control valve of claim 5, wherein the resilient portion defines a central aperture which forms a seal with the first valve element.

8. A liquid-responsive control valve for controlling the venting of fuel vapor from a fuel tank to a vapor canister in a manner providing a shutoff cue to a person filling the tank, comprising:

a control valve adapted for venting fuel vapor from the tank to the canister at a first higher rate when the fuel level in the tank is below a first level, at a second lower rate when the fuel level in the tank reaches the first level, and for closing when a second higher fuel level in the tank is reached, the control valve comprising two stage offset valve means responsive to the level of liquid fuel in the tank, the offset valve means comprising liquid level responsive float means, first and second valve means associated with the float means, and first and second vent outlet means, the float means being responsive to liquid fuel reaching the first level to force the first valve means to a position closing the first vent outlet means, the first valve means further including means for biasing the first valve means from the second valve means, and the float means being responsive to liquid fuel level above the first level to force the second valve means against the bias of the first valve means into sealing engagement with the second vent outlet means to close the control valve means;

wherein the first valve means comprises a first valve element axially moveable within a first valve cage, the first valve cage comprising peeling means for initially pulling a segment of the first valve element from the first vent outlet means when the float means moves away from the first vent outlet means in response to descending liquid fuel level.

9. The control valve of claim 8, wherein the second valve means comprises a second valve element in a second valve cage contained within the first valve cage below the first valve element.

10. The control valve of claim 9, wherein the second valve cage comprises peeling means for initially pulling a segment of the second valve element away from the second vent outlet means when the float means descends.

11. A liquid-responsive control valve for controlling the venting of fuel vapor from a fuel tank to a vapor canister in a manner providing a shutoff cue to a person filling the tank, comprising:

a control valve adapted for venting fuel vapor from the tank to the canister at a first higher rate when the fuel level in the tank is below a first level, at a second lower rate when the fuel level in the tank reaches the first level, and for closing when a second higher fuel level in the tank is reached, the control valve comprising two stage offset valve means responsive to the level of liquid fuel in the tank, the offset valve means comprising liquid level responsive float means, first and second valve means associated with the float means, and first and second vent outlet means, the float means being responsive to liquid fuel reaching the first level to force the first valve means to a position closing the first vent outlet means, the first valve means further including means for biasing the first valve means from the second valve means, and the float means being responsive to liquid fuel level above the first level to force the second valve means against the bias of the first valve means into sealing engagement with the second vent outlet means to close the control valve means;

wherein the first valve means comprises a first valve element axially moveable on the float means, the first valve means further comprising a resilient seal member mounted on the first vent outlet means such that the first valve means engages the seal member when the first valve means is forced by the float means to a position closing the first vent outlet means.

* * * * *

UNITED STATES PATENT AND TRADEMARK OFFICE
CERTIFICATE OF CORRECTION

PATENT NO. : 5,755,252
DATED : 5-26-98
INVENTOR(S) : Bergsma et al.

It is certified that error appears in the above-identified patent and that said Letters Patent is hereby corrected as shown below:

Column 1, line 8, after "5,590,697" insert --issued January 7, 1997--;

Column 1, between lines 66 and 67, insert heading --SUMMARY OF THE INVENTION--;

Column 12, line 64, delete "hungup" and insert --hung up--;

Column 14, line 56, delete "scaling" and insert --sealing--.

Signed and Sealed this

First Day of December, 1998

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,755,252
DATED : 5-26-98
INVENTOR(S): Bergsma et al.

It is certified that error appears in the above-identified patent and that said Letters Patent is hereby corrected as shown below:

In the drawings, Figures 2 and 2A should be replaced with the following Figures 2 and 2A: